(12) United States Patent
Simpson et al.

(10) Patent No.: US 7,578,043 B2
(45) Date of Patent: Aug. 25, 2009

(54) COUPLING TUBULARS

(75) Inventors: Neil Andrew Abercrombie Simpson, Aberdeen (GB); Simon John Harrall, Inverurie (GB); Paul David Metcalfe, Petercutter (GB); Neil James Glover, Aberdeen (GB); David Stephenson, Dubai (AE); Andrew Michael Duggan, Aberdeen (GB)

(73) Assignee: Weatherford/Lamb, Inc., Houston, TX (US)

( * ) Notice: Subject to any disclaimer, the term of this patent is extended or adjusted under 35 U.S.C. 154(b) by 126 days.

(21) Appl. No.: 11/449,571

(22) Filed: Jun. 8, 2006

(65) Prior Publication Data
US 2008/0007060 A1    Jan. 10, 2008

Related U.S. Application Data

(62) Division of application No. 10/613,341, filed on Jul. 3, 2003, now abandoned.

(30) Foreign Application Priority Data

Jul. 6, 2002    (GB) .................. 0215668.5

(51) Int. Cl.
  *B21D 39/00*  (2006.01)
  *B21D 53/84*  (2006.01)
  *E21B 23/00*  (2006.01)
  *F16L 15/00*  (2006.01)
  *F16L 19/00*  (2006.01)
  *F16L 13/14*  (2006.01)
  *F16L 35/00*  (2006.01)

(52) U.S. Cl. .............. 29/522.1; 285/33; 285/334.4; 285/335; 285/382; 285/390; 166/207; 166/380; 403/277

(58) Field of Classification Search ............... 29/522.1; 285/33, 334.4, 335, 382, 390; 166/207, 380; 403/277
See application file for complete search history.

(56) References Cited

U.S. PATENT DOCUMENTS

| | | | |
|---|---|---|---|
| 1,678,640 | A | 7/1928 | Hall |
| 1,820,644 | A | 8/1931 | Bach |
| 2,155,370 | A | 4/1939 | Hall et al. |
| 2,217,370 | A | 10/1940 | Johnston |
| 2,226,804 | A | 12/1940 | Carroll |
| 2,341,670 | A | 2/1944 | Stinson |
| 2,470,552 | A | 5/1949 | Gottschalk |
| 2,858,894 | A | 11/1958 | Akeyson |
| 2,873,985 | A | 2/1959 | Baldwin, Jr. |
| 3,062,568 | A | 11/1962 | Andresen et al. |
| 3,105,556 | A | 10/1963 | Raulins |
| 3,353,599 | A | 11/1967 | Swift |
| 3,419,079 | A | 12/1968 | Current |

(Continued)

FOREIGN PATENT DOCUMENTS

EP    0 171 144    2/1986

(Continued)

*Primary Examiner*—David P Bryant
*Assistant Examiner*—Alexander P Taousakis
(74) *Attorney, Agent, or Firm*—Patterson & Sheridan, L.L.P.

(57) ABSTRACT

An expandable coupling arrangement for coupling first and second tubulars includes a male thread portion on an end of the first tubular and a female thread portion on an end of the second tubular. The thread portions comprise dovetail threads having flanks, roots and crests, wherein the flanks are inclined at an angle of greater than 10°.

25 Claims, 4 Drawing Sheets

U.S. PATENT DOCUMENTS

| | | | |
|---|---|---|---|
| 3,766,991 A | 10/1973 | Brown | |
| 3,851,983 A | 12/1974 | MacKenzie | |
| 3,855,126 A | 12/1974 | Smith | |
| 3,857,450 A | 12/1974 | Guier | |
| 3,913,687 A | 10/1975 | Gyongyosi et al. | |
| 3,915,460 A | 10/1975 | Kramer | |
| 3,945,650 A | 3/1976 | Voltik | |
| 3,989,284 A | 11/1976 | Blose | |
| 4,076,280 A | 2/1978 | Young | |
| 4,449,596 A | 5/1984 | Boyadjieff | |
| 4,491,351 A | 1/1985 | Galle, Jr. et al. | |
| 4,550,937 A | 11/1985 | Duret | |
| 4,591,195 A | 5/1986 | Chelette et al. | |
| 4,611,838 A | 9/1986 | Hellmann et al. | |
| 4,619,472 A | 10/1986 | Kozono et al. | |
| 4,625,796 A | 12/1986 | Boyadjieff | |
| 4,659,119 A | 4/1987 | Reimert | |
| 4,703,959 A | 11/1987 | Reeves et al. | |
| 4,711,474 A | 12/1987 | Patrick | |
| 4,712,955 A | 12/1987 | Reece et al. | |
| 4,754,807 A | 7/1988 | Lange | |
| 4,771,829 A | 9/1988 | Sparlin | |
| 4,786,090 A | 11/1988 | Mott | |
| 4,786,900 A | 11/1988 | Karasawa et al. | |
| 4,793,422 A | 12/1988 | Krasnov | |
| 4,813,493 A | 3/1989 | Shaw et al. | |
| 4,822,081 A | 4/1989 | Blose | |
| 4,878,546 A | 11/1989 | Shaw et al. | |
| 4,917,409 A | 4/1990 | Reeves | |
| 4,985,975 A | 1/1991 | Austin et al. | |
| 5,015,017 A | 5/1991 | Geary | |
| 5,048,871 A | 9/1991 | Pfeiffer et al. | |
| 5,069,761 A | 12/1991 | Krings et al. | |
| 5,181,570 A | 1/1993 | Allwin et al. | |
| 5,251,709 A | 10/1993 | Richardson | |
| RE34,467 E | 12/1993 | Reeves | |
| 5,339,895 A | 8/1994 | Arterbury et al. | |
| 5,348,095 A | 9/1994 | Worrall et al. | |
| 5,360,240 A | 11/1994 | Mott | |
| 5,366,012 A | 11/1994 | Lohbeck | |
| 5,388,651 A | 2/1995 | Berry | |
| 5,415,442 A | 5/1995 | Klementich | |
| 5,480,196 A | 1/1996 | Adams, Jr. | |
| 5,520,422 A | 5/1996 | Friedrich et al. | |
| 5,667,011 A | 9/1997 | Gill et al. | |
| 5,782,503 A | 7/1998 | Noel et al. | |
| 5,810,401 A | 9/1998 | Mosing et al. | |
| 5,855,242 A | 1/1999 | Johnson | |
| 5,878,980 A | 3/1999 | Cooley, Jr. | |
| 5,901,789 A | 5/1999 | Donnelly et al. | |
| 5,906,398 A | 5/1999 | Larsen et al. | |
| 5,924,745 A | 7/1999 | Campbell | |
| 5,984,568 A | 11/1999 | Lohbeck | |
| 6,012,522 A | 1/2000 | Donnelly et al. | |
| 6,049,175 A | 4/2000 | Forsberg | |
| 6,109,349 A | 8/2000 | Simone et al. | |
| 6,158,507 A | 12/2000 | Rouse et al. | |
| 6,158,725 A | 12/2000 | Fischer | |
| 6,158,785 A | 12/2000 | Beaulier et al. | |
| 6,189,619 B1 | 2/2001 | Wyatt et al. | |
| 6,203,766 B1 | 3/2001 | Kawakami et al. | |
| 6,254,146 B1 | 7/2001 | Church | |
| 6,270,127 B1 | 8/2001 | Enderle | |
| 6,273,634 B1 | 8/2001 | Lohbeck | |
| 6,315,040 B1 | 11/2001 | Donnelly | |
| 6,322,109 B1 | 11/2001 | Campbell et al. | |
| 6,332,110 B1 | 12/2001 | Wolfe | |
| 6,409,175 B1 * | 6/2002 | Evans et al. | 277/314 |
| 6,454,013 B1 | 9/2002 | Metcalfe | |
| 6,457,532 B1 | 10/2002 | Simpson | |
| 6,481,760 B1 | 11/2002 | Noel et al. | |
| 6,554,287 B1 | 4/2003 | Sivley, IV et al. | |
| 6,607,220 B2 | 8/2003 | Sivley, IV | |
| 6,626,467 B1 | 9/2003 | Folkers et al. | |
| 6,626,471 B2 | 9/2003 | Mallis | |
| 6,685,236 B2 | 2/2004 | Setterberg, Jr. | |
| 6,789,822 B1 | 9/2004 | Metcalfe | |
| 6,955,647 B2 | 10/2005 | Rice | |
| 6,971,206 B2 | 12/2005 | Fukumoto et al. | |
| 7,017,950 B2 | 3/2006 | Macaulay | |
| 2001/0013860 A1 | 8/2001 | Gancarcik | |
| 2002/0027363 A1 | 3/2002 | Mallis et al. | |
| 2002/0070031 A1 | 6/2002 | Voll et al. | |
| 2003/0024708 A1 | 2/2003 | Ring et al. | |
| 2003/0067166 A1 | 4/2003 | Sivley, IV | |
| 2003/0067169 A1 | 4/2003 | Church | |
| 2003/0168858 A1 | 9/2003 | Hashem | |
| 2003/0168859 A1 | 9/2003 | Watts | |
| 2003/0234538 A1 | 12/2003 | Hashem | |
| 2004/0017081 A1 | 1/2004 | Simpson et al. | |
| 2004/0055759 A1 * | 3/2004 | Sivley, IV | 166/384 |
| 2004/0135370 A1 | 7/2004 | Evans et al. | |
| 2005/0021351 A1 | 1/2005 | Koskinen et al. | |

FOREIGN PATENT DOCUMENTS

| | | |
|---|---|---|
| EP | 0 659 975 | 6/1995 |
| EP | 0 803 637 | 10/1997 |
| EP | 1 106 776 | 6/2001 |
| GB | 706342 | 3/1954 |
| GB | 2 099 529 | 12/1982 |
| GB | 2 181 569 | 4/1987 |
| WO | WO 93/12323 | 6/1993 |
| WO | WO 93/25800 | 12/1993 |
| WO | WO 96/37680 | 11/1996 |
| WO | WO 96/37681 | 11/1996 |
| WO | WO 96/37687 | 11/1996 |
| WO | WO 97/17524 | 5/1997 |
| WO | WO 97/21901 | 6/1997 |
| WO | WO 98/22690 | 5/1998 |
| WO | WO 98/32948 | 7/1998 |
| WO | WO 98/42947 | 10/1998 |
| WO | WO 00/08301 | 2/2000 |
| WO | WO 02/059458 | 8/2002 |
| WO | WO 02/075197 | 9/2002 |
| WO | WO 03/032331 | 4/2003 |
| WO | WO 03/036012 | 5/2003 |
| WO | WO 03/078882 | 9/2003 |

* cited by examiner

COUPLING TUBULARS

CROSS-REFERENCE TO RELATED APPLICATIONS

This application is a divisional of U.S. patent application Ser. No. 10/613,341, filed Jul. 3, 2003, now abandoned which is herein incorporated by reference.

FIELD OF THE INVENTION

This invention relates to coupling tubulars, and in particular to coupling expandable tubulars, most particularly expandable downhole tubulars.

BACKGROUND OF THE INVENTION

Downhole tubulars, such as bore-lining casing and liners, are typically coupled by means of threaded connectors, or by providing adjacent ends of tubulars with male and female, or pin and box, threaded ends. For conventional applications, such coupling arrangements are generally satisfactory, providing secure, pressure tight connections. However, where strings of tubulars are to be diametrically expanded, it has been found that the integrity of the coupling may be compromised.

It is among the objectives of embodiments of the present invention to provide coupling arrangements for tubulars which will retain mechanical and pressure integrity following diametric expansion of the tubulars.

SUMMARY OF THE INVENTION

According to a first embodiment of the present invention there is provided an expandable coupling arrangement for first and second expandable tubulars, the coupling comprising:
  a male thread portion on an end of a first tubular; and
  a female thread portion on an end of a second tubular,
  the thread portions comprising dovetail threads and having flanks, roots and crests, wherein the flanks are inclined at an angle of greater than 10°.

On expansion of the engaged thread portions, the high angle dovetail threads maintain the integrity of the coupling. The invention has particular application in couplings which are to be subject to expansion by a rotary expansion tool. Such a tool expands the male or pin thread portion by reducing the wall thickness of the portion, resulting in a corresponding increase in circumference and diameter of the portion, which tends to be accompanied by axial elongation of the thread portion. However, the female or box thread portion is expanded by contact with the expanding male or pin thread portion. This tends to induce axial contraction of the female thread portion. In a conventional thread, this differential expansion tends to produce an adverse effect on the thread integrity, however in the present invention the opposite is true; the differential expansion tends to lock the thread portions together.

Preferably, the thread portions define a thread which is cut in an opposite direction to the intended direction of rotary expansion of the coupling, such that any torque applied to the coupling by the rotating expander will tend to tighten the coupling.

Each thread portion has stab flanks and load flanks, and it is preferred that both the stab flanks and the load flanks of each respective thread portion are inclined at substantially the same angle to the respective thread root.

Preferably, the flanks are inclined at an angle of greater than 15°.

Preferably, the flanks of the male thread portion are inclined at an angle of less than 80°, and most preferably less than 75°, to the male thread portion roots.

Preferably, the flanks of the female thread portion are inclined at an angle of less than 80°, and most preferably less than 75°, to the female thread portion roots.

The thread portions may be parallel, tapered or stepped.

Preferably, the first tubular has a leading end portion or nose adapted to be radially constrained by the second tubular. For example, the second tubular may define an undercut slot, recess or groove in which the nose is received. This prevents the nose from separating from the second tubular, and in particular from encroaching into the internal diameter of the coupling following expansion, as might otherwise occur due to "end effects", where the free end or nose tends to diametrically contract more than adjacent portions of the tubular. Alternatively, or in addition, the groove may extend axially and be dimensioned to accommodate axial extension of the first tubular relative to the second tubular. The groove may accommodate a deformable sealing material, such as an elastomer, in particular an elastomer o-ring or the like which will be energised by relative axial extension of the male thread. Preferably, the free end of the first tubular is not threaded, to permit axial movement of the nose relative to the second tubular, and thus to energise, or further energise, the deformable seal, where provided. Preferably, the groove features a rounded recess angle, to prevent stress concentration and to alleviate stress-induced cracking upon expansion.

Preferably, the first tubular comprises at least one sealing member for sealing engagement with an opposing surface of the second tubular, most preferably for sealing engagement with an opposing surface adjacent a free end of the second tubular. Conveniently, the sealing engagement is provided with a surface spaced sufficiently from the free end of the second tubular to accommodate axial shrinkage of the tubular following expansion. The end effect of the free end also serves to energise the sealing member. Most preferably, the sealing member is in the form of an elastomer. At least two axially spaced elastomers may be provided. The sealing members may be located in appropriate grooves in the first tubular.

Where sealing members are provided, it is preferred that these are formed of swelling elastomers, or other materials which swell or expand when exposed to a selected fluid, most preferably the fluid or fluids contained by the sealing member. Thus, a seal will be re-energised in the event of a leak. The use of adjacent sealing members which swell in response to contact with different fluids ensures re-energisation of a leaking seal in an environment where the seal may be exposed to a number of different fluids, for example a water-swell elastomer and an oil-swell elastomer in adjacent grooves provides for re-energising a seal in a water and oil environment.

The material properties of the male and female threads may be selected to facilitate the creation of a secure engage between the threads following expansion.

Preferably, at least some of the crests of the threads are adapted to extend axially on expansion of the coupling. On expansion of the coupling, the root portions of the threads, particularly the root portions of the male thread portion, will tend to elongate to a greater extent than the other, thicker portions of the threads. There is thus a possibility of a loss of contact between the flanks of the engaged thread portions. To counter this possibility, the crests may be configured to splay outwardly on experiencing the radial compression associated with expansion of the coupling. In one embodiment this is achieved by providing a relief or slot in the crest. This effect may be enhanced by providing a rib or spreader on at least some of the roots.

The various features described above may be incorporated in other couplings, in addition to couplings made in accordance with the first embodiment of the present invention.

BRIEF DESCRIPTION OF DRAWINGS

This and other aspects of the present invention will now be described, by way of example, with reference to the accompanying drawings, in which.

DETAILED DESCRIPTION OF THE DRAWING

Figure 1:
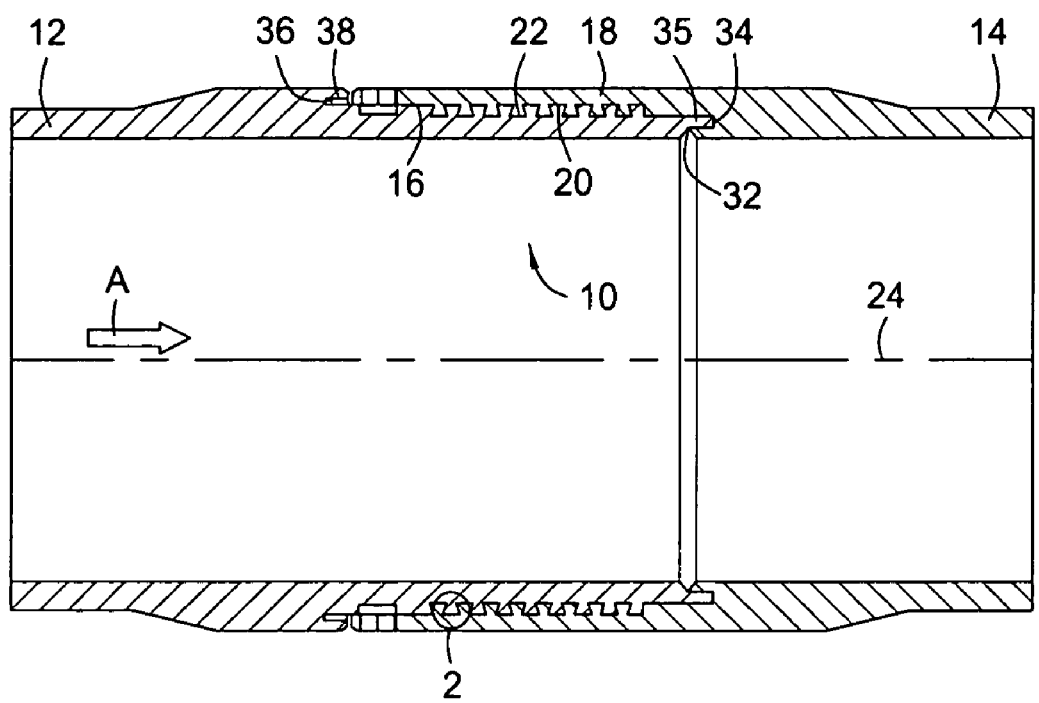
FIG. 1 is a sectional drawing of a tubular coupling in accordance with an embodiment of the present invention.
Figure 2:
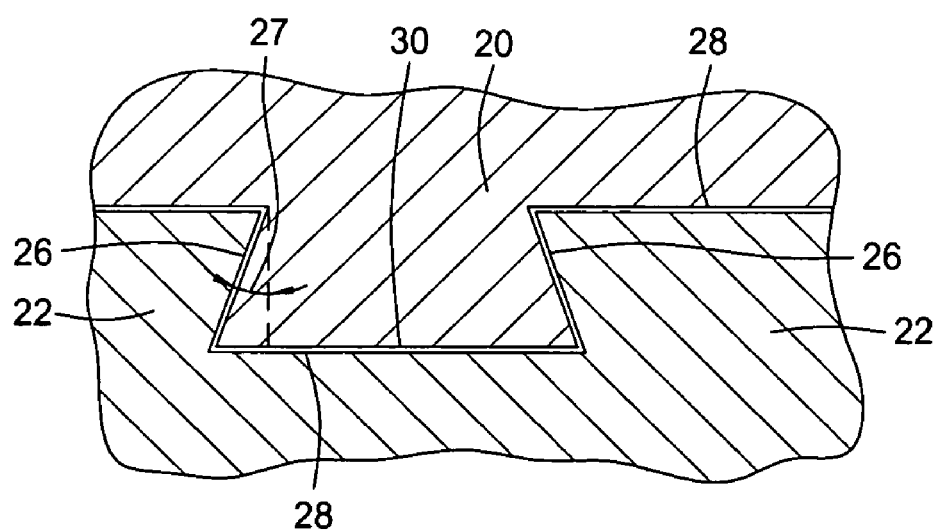
FIG. 2 is an enlarged view of area 2 of FIG. 1.

FIGS. 1 and 2 of the drawings illustrate an upset threaded coupling 10 connecting the ends of first and second downhole tubulars 12, 14. The end of the first tubular 12 features a male threaded portion 16, or pin connection, while the adjacent end of the second tubular 14 features a corresponding female threaded portion 18, or box connection. The male and female threads 20, 22 are parallel, that is the roots and crests of the threads extend parallel to the longitudinal axis 24 of the coupled tubulars 12, 14, and as may be seen more clearly from FIG. 2, the threads 20, 22 are dovetailed. In particular, each thread has flanks 26, roots 28 and crests 30, and the flanks 26 are inclined at an angle 27 of greater than 15° to the roots 28 and the crests 30.

The leading end of the first tubular 12 has a nose 32 which, when the tubulars 12, 14 are coupled, is located in an axially-extending circumferential groove 34 at the base of the female threaded portion 18. The groove 34 accommodates an elastomeric O-ring 35. The free end of the second tubular 14 is similarly located in a corresponding groove 36 at the base of the male portion 16, which also accommodates an o-ring 38, and the free end of the second tubular 14 is also pinned to the male portion 16 to prevent relative rotation.

In use, the coupling 10 is made up on surface in the usual manner, that is the ends of the tubular will be brought together, the first tubular 12 then rotated relative to the second tubular 14 to make up the threads, and the made-up ends then pinned. In this manner a tubing string will be created, and will be run into a bore. Once in position in the bore, a rotary expansion tool is run through the string, in direction "A", to diametrically expand the tubing. When the tool encounters a coupling 10, the male threaded portion 16 is subject to diametric expansion, by virtue of the wall thickness of the portion being reduced, with a corresponding increase in circumference. The increasing outside diameter of the male portion 16 causes the surrounding female portion 18 to experience a corresponding increase in diameter. Furthermore, the increase in diameter of the male portion 16 is accompanied by axial extension, whereas the increase in diameter of the female portion 18 is accompanied by axial contraction.

Whereas in a conventional thread profile such deformation tends to have an adverse affect on the integrity of the coupling, in the coupling 10 the deformation of the high angle dovetail thread locks the male and female portions 16, 18 together, such that mechanical and hydraulic integrity is retained, and indeed enhanced. Furthermore, any tendency of the male portion 16 to axially extend relative to the female portion 18 is accommodated by the groove 34, and is not restrained at the free end of the first tubular due to the absence of inter-engaging threads. Thus, the differential axial expansion and contraction of the tubulars 12, 14 is utilised to further energise the o-ring 35 in the groove 34. The groove 34 also prevents the nose of the first tubular 12 from encroaching on the internal diameter once the expansion tool has passed.

The male and female thread portions 16, 18 may be formed of the same or different materials, and the material properties, such as the yield strength, may be selected to facilitate creation of a secure lock.

Figure 3:
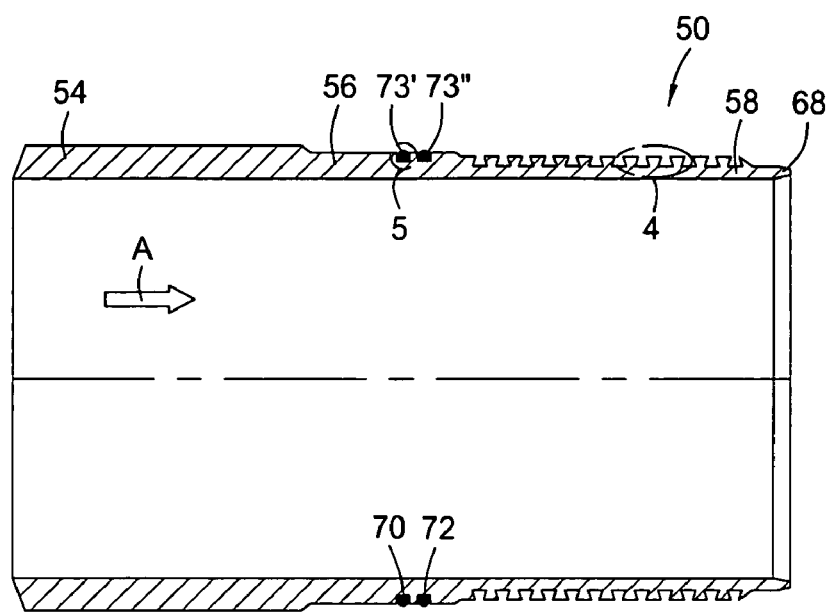
FIG. 3 is a sectional drawing of a pin connector forming part of a coupling in accordance with a further embodiment of the present invention.
Figure 4:
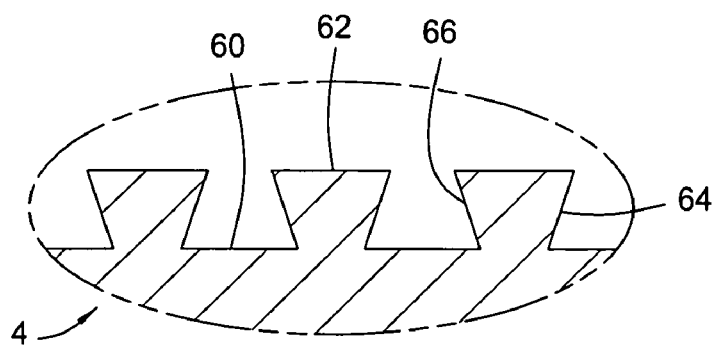
FIG. 4 is an enlarged view of area 4 of FIG. 3.

Reference is now made to FIGS. 3 to 8 of the drawings, which illustrate a pin connector 50 (FIGS. 3, 4 and 5), and a box connector 52 (FIGS. 6, 7 and 8), together forming a coupling in accordance with a further embodiment of the present invention. Reference is made first to FIG. 3, which is a sectional drawing of the pin connector 50, which may be welded to the end of an appropriate expandable tubular, or which may be machined in the end of a tubular. From a maximum outer diameter portion 54, the pin 50 steps down in diameter first to a seal portion 56 and then to the male threaded portion 58. The "quick-start" thread is left-handed and dovetailed, the details of the thread being more readily visible in FIG. 4, which is an enlarged view of area 4 of FIG. 3.

The thread features parallel roots 60 and crests 62, and both the stab and load flanks 64, 66 are angled at 75 degrees to roots 60. The free end or nose 68 of the pin 50 is rounded and defines a negative angle of 45 degrees.

Figure 5:
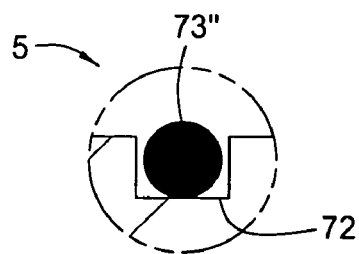
FIG. 5 is an enlarged view of area 5 of FIG. 3.

The seal portion 56 is substantially cylindrical, but defines two circumferential grooves 70, 72, one of which is illustrated in greater detail in FIG. 5. The grooves 70, 72 receive respective O-rings (not shown) of swelling elastomer: one o-ring swells in response to contact with water, while the other swells from contact with oil.

Figure 6:
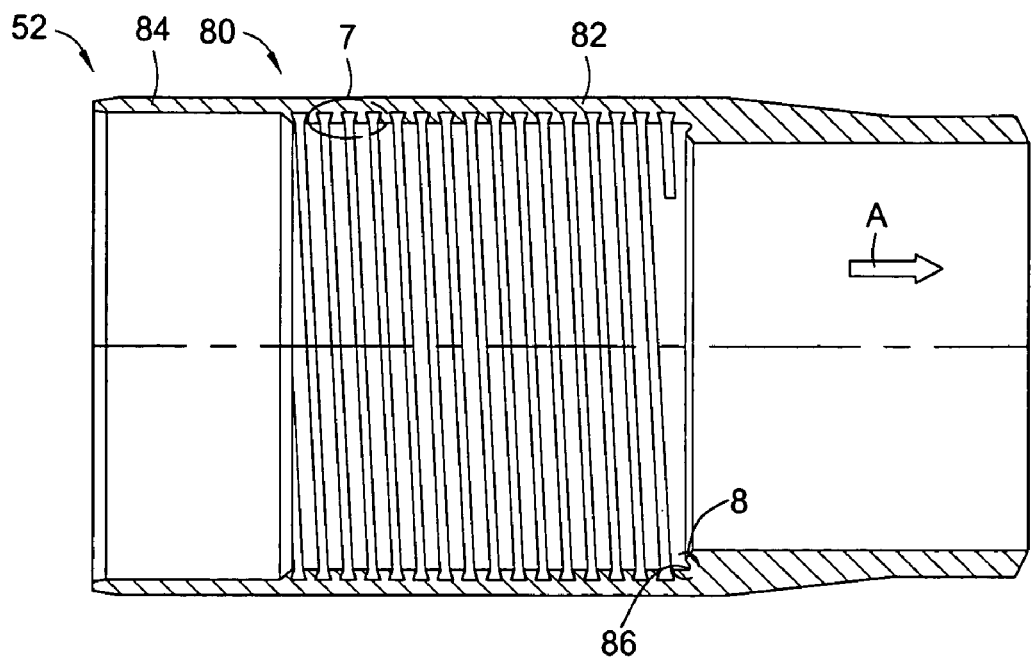
FIG. 6 is a sectional drawing of a box connector forming part of a coupling in accordance with said further embodiment of the present invention, and configured to be coupled with the pin connector of FIG. 3.
Figure 7:
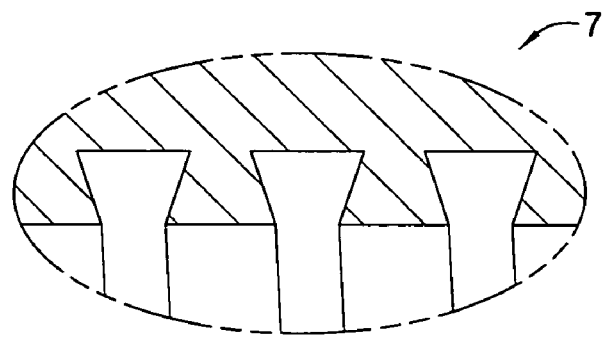
FIG. 7 is an enlarged view of area 7 of FIG. 6.
Figure 8:
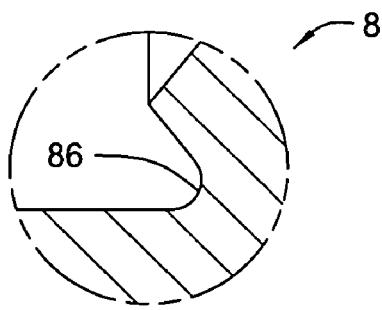
FIG. 8 is an enlarged view of area 8 of FIG. 6.

Reference is now made in particular to FIG. 6, which illustrates the box connector 52. Like the pin 50, the box 52 may be machined into the end of a tubular, or may be formed separately and then welded to the end of a tubular. The box 52 has an upset portion 80 which contains the female thread portion 82. The left-handed dovetail thread (FIG. 7) is spaced from the free end of the box 52 by a smooth-walled portion 84 for cooperating with the seal portion 56 of the pin 50 (FIG. 3).

At the inner end of the thread 82 is a rounded undercut groove 86 (FIG. 8) adapted to receive and retain the pin nose 68 when the threads are made up.

The coupling 50, 52 is used in a similar manner to the coupling 10, that is tubulars provided with the pin and box ends are made up on surface to form a string and then run into a bore. A rotary expansion tool is then run through the string, the tool being rotated clockwise as the tool is advanced axially through the string. When the tool encounters a coupling 50, 52, travelling in direction "A", the tool will induce compressive yield in the pin 50, reducing the pin wall thickness and thus increasing the pin diameter. This increase in diameter forces the surrounding portions of the box 52 to diametrically expand. The different natures of the expansion mechanisms of the pin 50 and box 52 are such that the expanded pin 50 tends to extend axially, while the expanded box 52 tends to contract. This locks the threads 58, 82 together. However, where relative axial movement is permitted, that is between the pin seal portion 56 and the smooth bore box portion 84, the relative dimension of the portions and the locations of the seal grooves 70, 72 are selected to ensure maintenance of the seal between the opposing surfaces. In addition, the end effects experienced by the free end of the box 52, which will cause the free end to tend to diametrically contract to a greater degree following passage of the expansion tool, also serves to maintain a seal.

The pin nose 68 experiences a similar end effect, however the nose is prevented from contracting by the engagement between the nose 68 and the groove 86.

Once the rotary expansion tool has passed through the pin 50 and engages directly the wall of the box 52, the box 52 will experience a clockwise torque. As the pin 50 and box 52 define a left-handed thread, this applied torque will therefore tend to tighten the threads; it has been found that diametric expansion of threaded couplings made up to a specified torque may lead to loosening of the coupling, and if this should occur the use of a thread direction which is opposed to the direction of rotation of the expander will serve to mitigate this effect.

Figure 9:
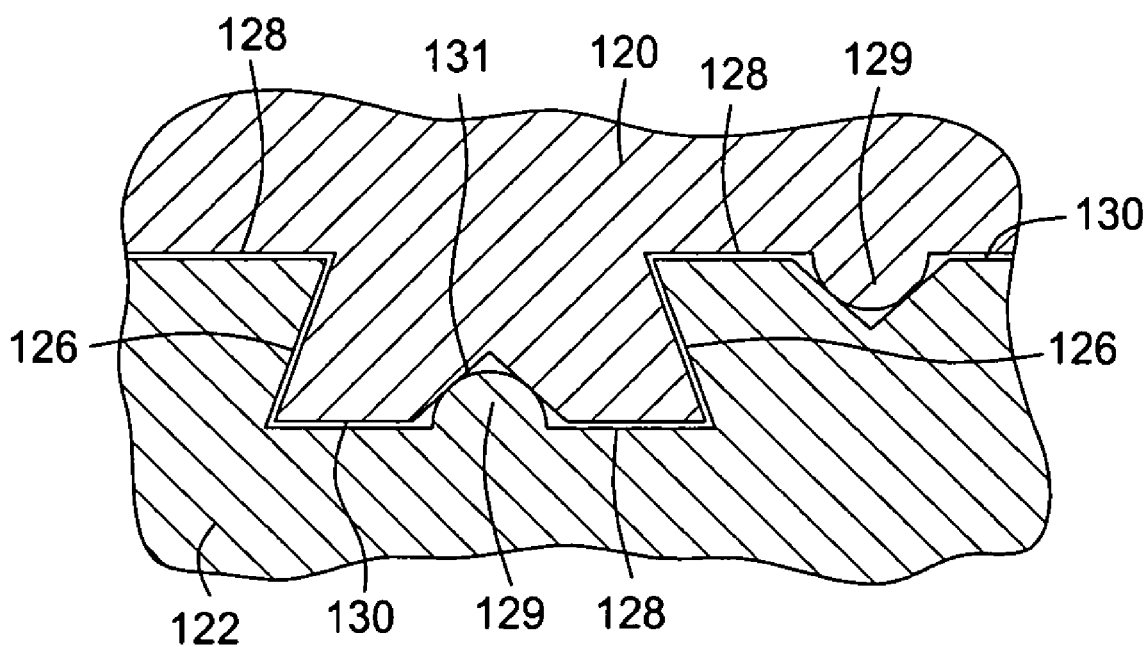
FIG. 9 is an enlarged view of an area of part of a coupling in accordance with a still further embodiment of the present invention.

Reference is now made to FIG. 9 of the drawings, which illustrates details of a coupling in accordance with a still further embodiment of the invention. On expansion of the coupling by means of a rotary expander, the male thread 120 axially extends in addition to the desired diametric expansion. Furthermore, the relatively thin-walled portions of the thread 120, that is the root portions 128, tend to experience a greater degree of extension.

This introduces a risk that there will be a loss of contact between the male and female thread flanks 126. To avoid this possibility, the thread crests 130 feature a relief 131, and the roots 128 feature a raised rib 129. Thus, when the coupling is expanded, and the male thread 120 is radially thinned and urged outwardly to expand the surrounding female thread 122, each crest 130 is urged into the opposing root 128, the relief 131 and the rib 129 co-operating to splay the crest 130. The axial extent of the crest 130 therefore increases, as does the flank angle, such that the thread flanks 126 are maintained in engagement.

Those of skill in the art will appreciate that the above described embodiments are merely exemplary of the present invention and that various modifications and improvements may be made thereto, without departing from the scope of the present invention.

The invention claimed is:

1. A method of expanding a threaded coupling arrangement, comprising:
   forming the threaded coupling arrangement between a first tubular and a second tubular, the threaded coupling having a threaded portion, wherein at least one thread root on the first tubular includes a spreader adapted to splay a corresponding thread crest on the second tubular upon expansion the threaded coupling; and
   expanding the threaded coupling arrangement, thereby causing the threaded portion to interlock therebetween to prevent separation of the first tubular from the second tubular.

2. The method of claim 1, wherein the coupling arrangement is configured to accommodate relative axial extension between the first tubular and the second tubular.

3. The method of claim 1, wherein the threaded coupling further includes a deformable seal within a groove.

4. The method of claim 3, further including energizing the deformable seal by relative axial extension of the first tubular due to expansion thereof.

5. The method of claim 3, wherein the deformable seal comprises a material capable of swelling upon exposure to a selected material.

6. The method of claim 1, wherein the expander tool includes at least one extendable member which is configured as is a roller member.

7. The method of claim 1, wherein the threaded portion is tapered.

8. The method of claim 1, wherein the threaded coupling is positioned downhole before expansion.

9. The method of claim 1, wherein the threaded portion includes a plurality of dovetail threads having flanks that are inclined at an angle of greater than 10° relative to the roots.

10. A method of expanding a threaded coupling, comprising:
    forming the threaded coupling by threadly connecting a first tubular to a second tubular, wherein a nose portion on the first tubular is spaced apart from a groove portion on the second tubular at a first axial distance; and
    expanding the threaded coupling with an expander tool causing the threads to form an interference therebetween and causing the groove portion to accommodate any axial extension of the first tubular due to expansion thereof such that the nose portion is spaced apart from the groove portion at a second smaller axial distance, thereby preventing separation of the first tubular from the second tubular.

11. The method of claim 10, wherein the threads are cut in one direction.

12. The method of claim 11, further including rotating the expander tool in an opposite direction of the threads.

13. The method of claim 10, wherein at least some of the crests of the threads are adapted to extend axially on expansion of the coupling.

14. The method of claim 10, wherein the thread portions are stepped.

15. A method of expanding a threaded coupling, comprising:
    forming the threaded coupling by connecting a first tubular having a male thread portion with a second tubular having a female thread portion, wherein each thread portion includes a plurality of roots and a plurality of flanks, wherein at least one thread root on the first tubular and at least one thread root on the second tubular includes a spreader adapted to splay a corresponding thread crest on the other tubular upon expansion the threaded coupling; and
    expanding the threaded coupling with an expander tool, wherein the male thread portion engages with the female thread portion by an interlocking and an overlapping relation between at least one back flank and at least one front flank in each threaded portion thereby ensuring the male and female thread portions do not radially separate during diametric expansion.

16. The method of claim 15, wherein the material properties of the male thread portion and female thread portion are selected to facilitate engagement of the threads on the coupling being subject to rotary expansion.

17. The method of claim 15, wherein each thread portion includes a plurality of dovetail threads having flanks that are inclined at an angle of greater than 10° relative to the roots.

18. The method of claim 15, wherein the threaded coupling further includes a deformable seal capable of swelling upon exposure to a selected material.

19. The method of claim 15, further including rotating the expander tool in an opposite direction of the threads.

20. A method for expanding a threaded connection comprising:
  providing a pin member having a plurality of dovetail threads and an end portion;
  providing a box member having a plurality of dovetail threads and a recess, the end portion and the recess configured to have a pre-expanded relative position having a first axial distance and a post-expanded relative position having a second smaller axial distance;
  connecting the pin member and the box member to form the threaded connection; and
  expanding the threaded connection, thereby moving the end portion and the recess from the pre-expanded relative position to the post expanded relative position.

21. The method of claim 20, wherein dovetail threads include flanks that are inclined at an angle of greater than 10° relative to the roots.

22. The method of claim 20, wherein a rotary expander expands the threaded connection.

23. The method of claim 20, further including axially elongating a portion of the pin member as the threaded connection is expanded.

24. The method of claim 20, further including axially contracting a portion of the box member as the threaded connection is expanded.

25. The method of claim 20, further including energizing a seal member as the end portion and the recess move from the pre-expanded relative position to the post-expanded relative position.

* * * * *